(12) United States Patent
Kamio

(10) Patent No.: US 10,941,860 B2
(45) Date of Patent: Mar. 9, 2021

(54) SHIFT RANGE CONTROL APPARATUS

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 138 days.

(21) Appl. No.: 16/092,805

(22) PCT Filed: Mar. 6, 2017

(86) PCT No.: PCT/JP2017/008696
§ 371 (c)(1),
(2) Date: Oct. 11, 2018

(87) PCT Pub. No.: WO2017/179336
PCT Pub. Date: Oct. 19, 2017

(65) Prior Publication Data
US 2019/0120372 A1    Apr. 25, 2019

(30) Foreign Application Priority Data
Apr. 15, 2016    (JP) .............................. JP2016-081920

(51) Int. Cl.
*F16H 61/32*    (2006.01)
*F16H 61/30*    (2006.01)
(Continued)

(52) U.S. Cl.
CPC .............. *F16H 61/32* (2013.01); *F16H 61/26* (2013.01); *F16H 61/30* (2013.01); *H02P 6/24* (2013.01);
(Continued)

(58) Field of Classification Search
CPC .......... F16H 61/32; F16H 61/26; F16H 61/30; F16H 2061/326; H02P 23/0027; H02P 6/24
See application file for complete search history.

(56) References Cited

U.S. PATENT DOCUMENTS 6,866,611 B2 *  3/2005  Tsuzuki ................ F16H 59/105
                                                        475/119
8,579,763 B2 * 11/2013  Nakade ................... F16H 61/12
                                                        477/126
(Continued)

FOREIGN PATENT DOCUMENTS

| JP | 2011-231841 | 11/2011 |
|---|---|---|
| JP | 2017-175067 | 9/2017 |
| JP | 2017-194147 | 10/2017 |

OTHER PUBLICATIONS

English Translation of Office Action for JP 2016-081920 (Year: 2019).*

(Continued)

*Primary Examiner* — Victor L Macarthur
(74) *Attorney, Agent, or Firm* — Nixon & Vanderhye PC

(57) ABSTRACT

A shift range control apparatus switches shift ranges by controlling a drive of a motor. The shift range control apparatus is provided with a motor drive controller and an actual range determination portion. The motor drive controller is capable of switching between at least two control modes as motor control modes that are modes in which the motor is controlled. The actual range determination portion determines an actual shift range, based on a requested shift range and the motor control modes.

4 Claims, 6 Drawing Sheets

(51) Int. Cl.
  *H02P 6/24* (2006.01)
  *F16H 61/26* (2006.01)
  *H02P 23/00* (2016.01)

(52) U.S. Cl.
  CPC .... *H02P 23/0027* (2013.01); *F16H 2061/326* (2013.01)

(56) References Cited

U.S. PATENT DOCUMENTS

| | | | |
|---|---|---|---|
| 9,209,729 B2* | 12/2015 | Maruo | H02P 23/0027 |
| 2004/0008002 A1 | 1/2004 | Kamio et al. | |
| 2004/0066166 A1 | 4/2004 | Nakai et al. | |
| 2005/0174084 A1 | 8/2005 | Nakai et al. | |
| 2006/0006827 A1 | 1/2006 | Nakai et al. | |
| 2006/0108966 A1 | 5/2006 | Kamio et al. | |
| 2010/0256880 A1* | 10/2010 | Sato | F16H 59/105 |
| | | | 701/55 |
| 2012/0283066 A1* | 11/2012 | Nakade | F16H 61/12 |
| | | | 477/79 |
| 2015/0222211 A1 | 8/2015 | Maruo et al. | |

OTHER PUBLICATIONS

English Translation of Office Action for CN 201780022096.3 (Year: 2017).*

English Translation of 237 form for PCT JP2017008686 (Year: 2017).*

\* cited by examiner

SHIFT RANGE CONTROL APPARATUS

CROSS REFERENCE TO RELATED APPLICATION

This application is the U.S. national phase of International Application No. PCT/JP2017/008696 filed Mar. 6, 2017, which designated the U.S. and claims priority to Japanese Patent Application No. 2016-81920 filed on Apr. 15, 2016, the entire contents of each of which are incorporated herein by reference.

TECHNICAL FIELD

The present disclosure relates to a shift range control apparatus.

BACKGROUND ART

Position switching control system that switches shift ranges by controlling a motor in response to a command from the driver to switch the shift range has been known. In Patent Literature 1, for example, it is determined whether the shift range is P range or "not P range", based on the rotation angle of the rotor, to be used for the control or the like of the automatic transmission.

PRIOR ART LITERATURES

Patent Literature

Patent Literature 1: JP 4189953 B2

SUMMARY OF INVENTION

When there is a transmission provided between a motor shaft and an output shaft as in Patent Literature 1, the rotation angle of the rotor may sometimes be different from the angle of the output shaft due to the play in gear teeth. In order to determine the shift range, based on the rotation angle of the rotor, as described in Patent Literature 1, for example, a correction needs to be made so that the rotor ration angle matches the output shaft angle. When the shift range is determined based on values detected by an output shaft sensor, for example, the detection accuracy of the output shaft sensor needs to be made higher.

It is an object of the present disclosure to provide a shift range control apparatus capable of correctly determining the shift range.

A shift range control apparatus according to one embodiment of the present disclosure switches the shift range by controlling the motor drive. The shift range control apparatus includes a motor drive controller, and an actual range determination portion.

The motor drive controller is capable of switching between at least two control modes as motor control modes that are modes in which the motor is controlled.

The actual range determination portion determines the actual shift range based on a requested shift range and the motor control mode.

In this way, it may be possible to correctly determine the shift range based on the motor control mode.

BRIEF DESCRIPTION OF DRAWINGS

The above and other aspects, features and advantages of the present disclosure will become more apparent from the following detailed description made with reference to the accompanying drawings. In the drawings.

EMBODIMENTS FOR CARRYING OUT INVENTION

The shift range control apparatus according to the present disclosure will be described with reference to the drawings.

First Embodiment

The shift range control apparatus according to one embodiment of the present disclosure is shown in FIGS. 1 to 6.

Figure 1:
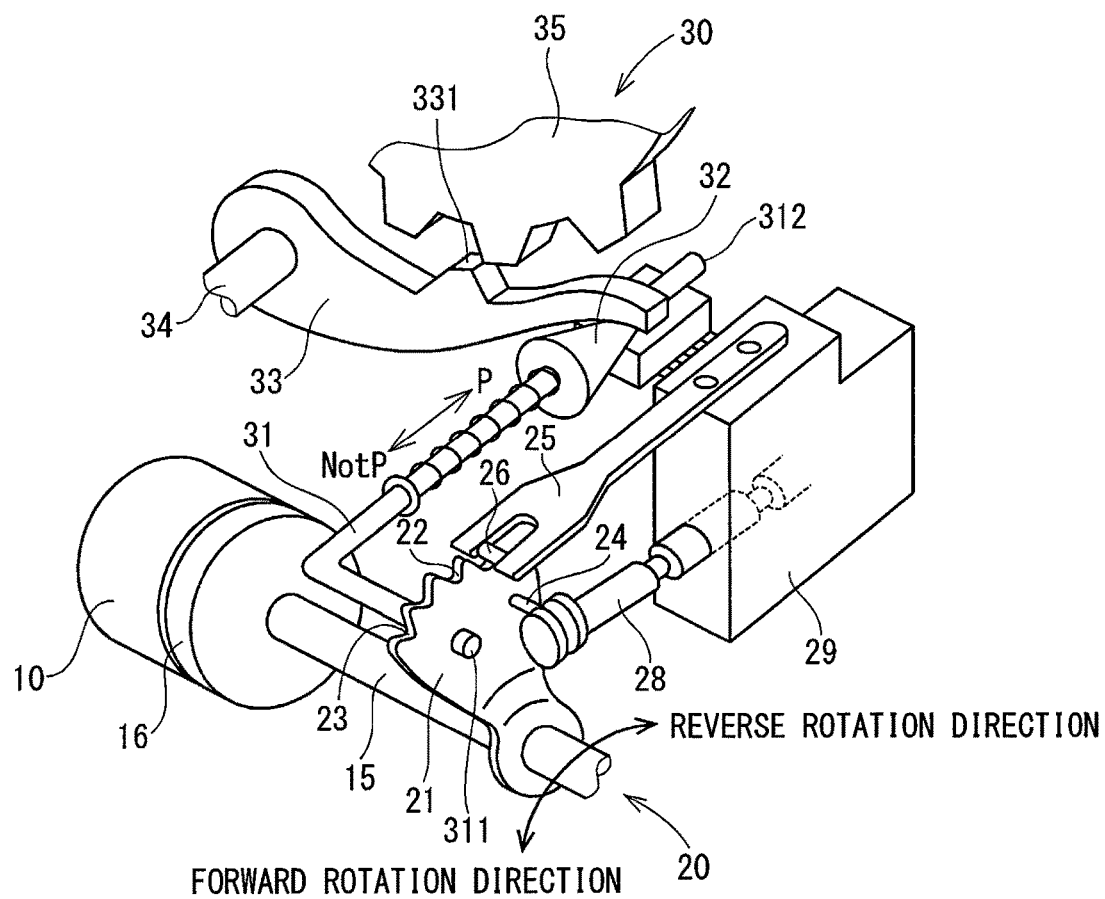
FIG. 1 is a perspective view of a shift-by-wire system according to one embodiment of the present disclosure.
Figure 2:
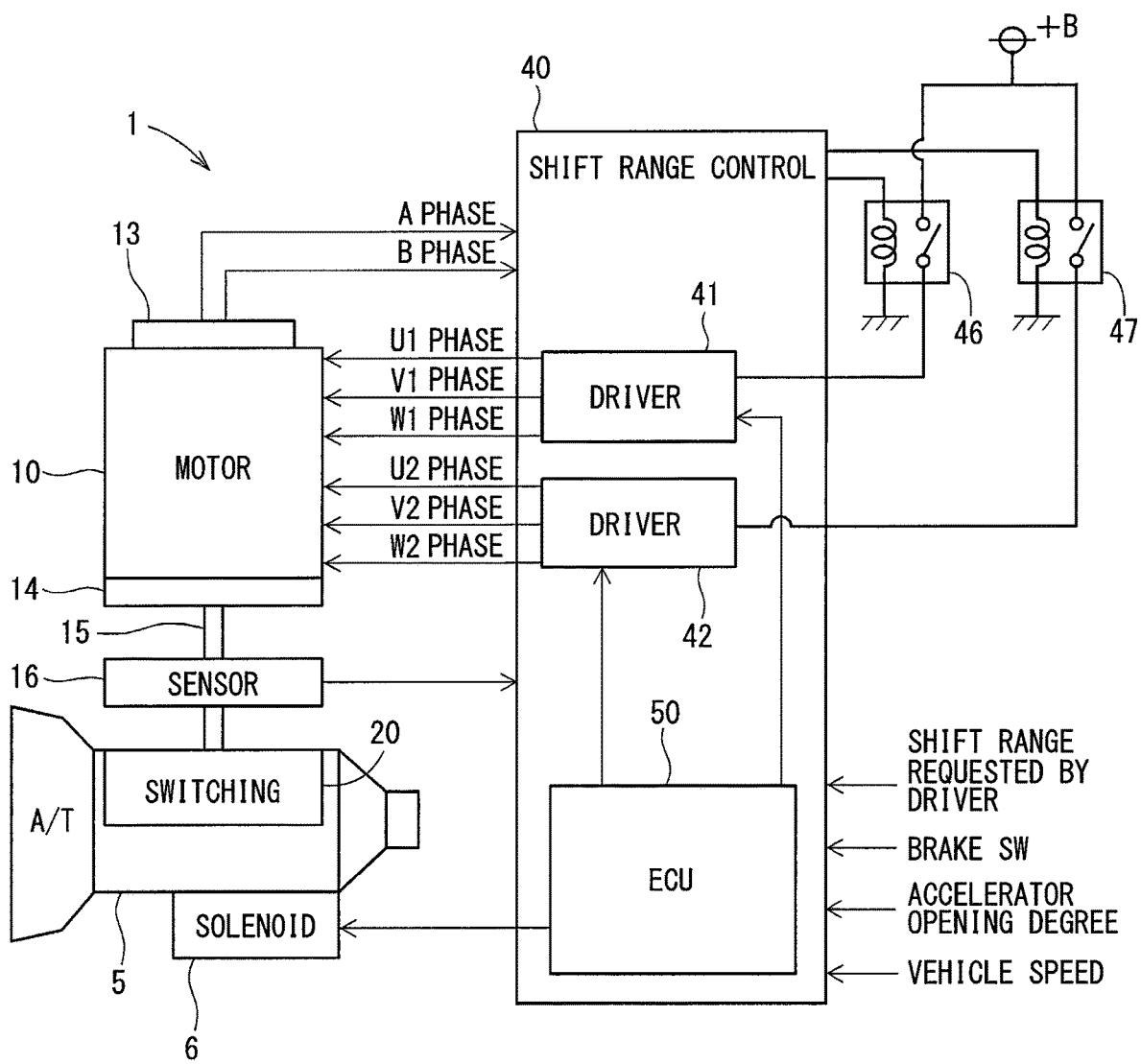
FIG. 2 is a schematic configuration diagram of the shift-by-wire system according to one embodiment of the present disclosure.

As shown in FIGS. 1 and 2, a shift-by-wire system 1 includes a motor 10, a shift range switching mechanism 20, a parking lock mechanism 30, a shift range control apparatus 40, or the like.

Figure 3:
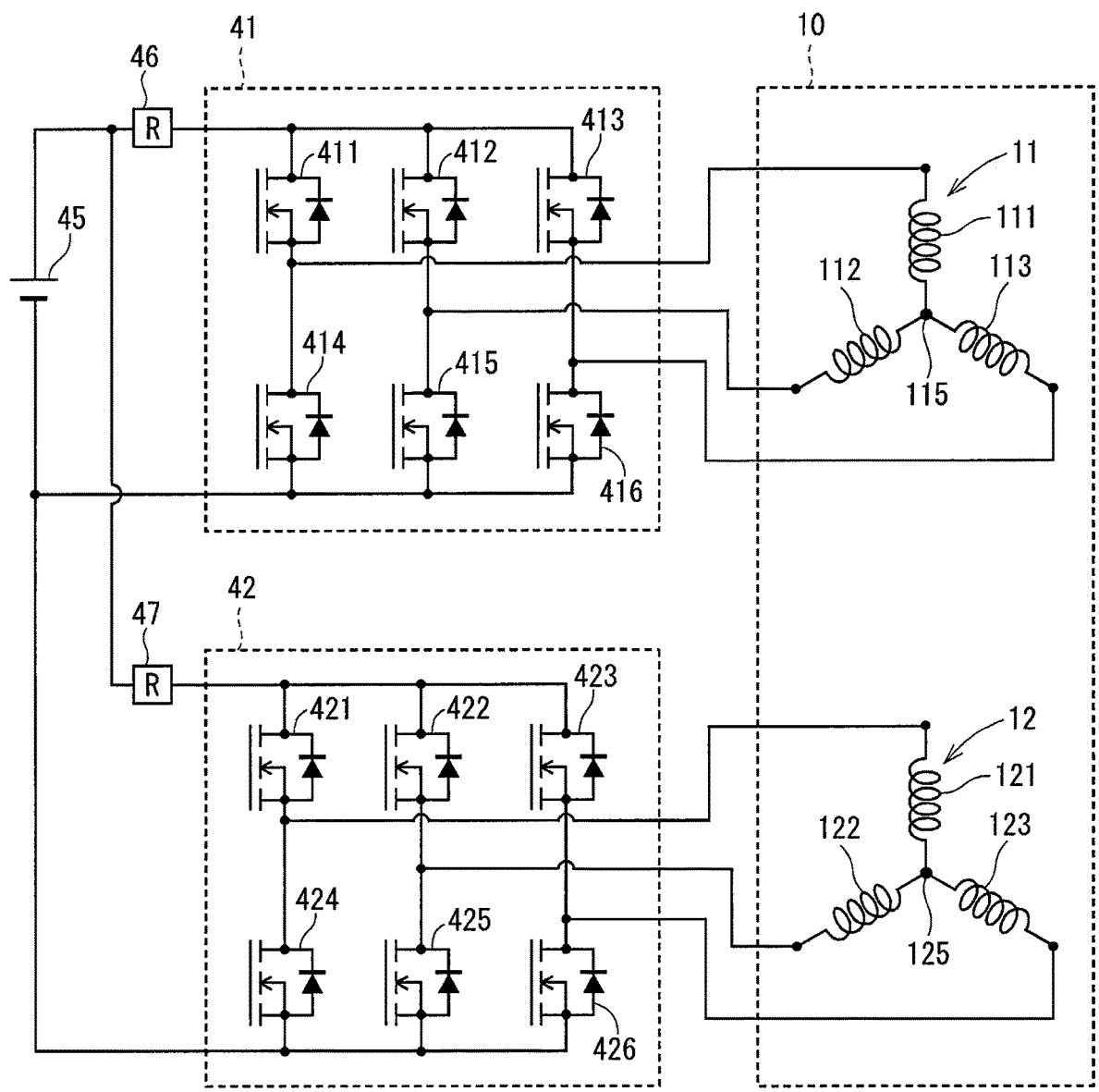
FIG. 3 is a circuit diagram illustrating a motor and a motor drive according to one embodiment of the present disclosure.

The motor 10 is rotated by the power supplied from a battery 45 (see FIG. 3) carried in the vehicle (not shown) and functions as the drive source of the shift range switching mechanism 20. The motor 10 is capable of changing the amount of current by a feedback control and of varying the command for each phase. The motor 10 of the present embodiment is a permanent magnet DC brushless motor. As shown in FIG. 3, the motor 10 includes two sets of windings 11 and 12. The set of a first windings 11 includes a U1 coil 111, a V1 coil 112, and a W1 coil 113. The set of a second windings 12 includes a U2 coil 121, a V2 coil 122, and a W2 coil 123.

As shown in FIG. 2, an encoder 13 detects the rotating position of a rotor (not shown) of the motor 10. The encoder 13 is a magnetic rotary encoder, for example, which is made up of magnets that rotate with the rotor, Hall ICs for detecting magnetic fields, or the like. The encoder 13 outputs A-phase and B-phase pulse signals for each predetermined angle in synchronism with the rotation of the rotor.

A speed reducer 14 is provided between the motor shaft of the motor 10 and an output shaft 15 to output the rotation of the motor 10 to the output shaft 15 at a reduced rate. The rotation of the motor 10 is thus transmitted to the shift range switching mechanism 20. An output shaft sensor 16 is provided to the output shaft 15 for detecting the angle of the output shaft 15. The output shaft sensor 16 may by a potentiometer, for example.

As shown in FIG. 1, the shift range switching mechanism 20 includes a detent plate 21, a detent spring 25, and the like, and transmits the rotary drive force output from the speed reducer 14 to a manual valve 28 and the parking lock mechanism 30.

The detent plate 21 is fixed to the output shaft 15 and driven by the motor 10. In the present embodiment, the direction in which the detent plate 21 moves away from the proximal end of the detent spring 25 is referred to as a forward rotation direction (or a positive rotation direction), and the direction in which the detent plate approaches the proximal end is referred to as a reverse rotation direction (or a negative rotation direction).

The detent plate 21 has a pin 24 protruding parallel to the output shaft 15. The pin 24 is connected to the manual valve 28. As the detent plate 21 is driven by the motor 10, the manual valve 28 reciprocates along the axial direction. That is, the shift range switching mechanism 20 converts the rotary motion of the motor 10 to linear movement and transmits the linear movement to the manual valve 28. The manual valve 28 is provided to a valve body 29. The reciprocating movement along the axial direction of the manual valve 28 switches hydraulic pressure supply paths to a hydraulic clutch (not shown) to switch the engaged state of the hydraulic clutch, and the shift range is switched.

The detent plate 21 has four recesses 22 on the side closer to the detent spring 25, for retaining the manual valve 28 at positions corresponding to respective shift ranges. The recesses 22 each correspond to the respective shift ranges of D (drive), N (neutral), R (reverse), and P (park) ranges from the proximal end of the detent spring 25.

The detent spring 25 is a resiliently deformable plate-like member and has a detent roller 26 provided at its tip. The detent roller 26 fits into one of the recesses 22.

The detent spring 25 presses the detent roller 26 toward the rotation center of the detent plate 21. A rotary force of equal to or more than a predetermined level applied to the detent plate 21 deforms the detent spring 25 resiliently to cause the detent roller 26 to move from one recess 22 to another. With the detent roller 26 fitted in one of the recesses 22, the pivoting motion of the detent plate 21 is restricted, which determines the axial position of the manual valve 28 and the state of the parking lock mechanism 30, as well as the shift range of the automatic transmission 5.

The parking lock mechanism 30 includes a parking rod 31, a conical member 32, a parking lock pawl 33, a shaft part 34, and a parking gear 35.

The parking rod 31 is generally L-shaped and one end 311 thereof is fixed to the detent plate 21. The conical member 32 is provided to the other end 312 of the parking rod 31. The conical member 32 is formed so as to be tapered toward the other end 312. When the detent plate 21 pivots in the reverse rotation direction, the conical member 32 moves toward the direction of arrow P.

The parking lock pawl 33 abuts on a conical surface of the conical member 32 and is pivotable around the shaft part 34. On the side facing the parking gear 35, the parking lock pawl 33 has a protrusion 331 that can mesh with the parking gear 35. When the detent plate 21 rotates in the reverse rotation direction, the conical member 32 moves in the direction of an arrow P, and the parking lock pawl 33 is pushed up so that the protrusion 331 meshes with the parking gear 35. Contrastingly, when the detent plate 21 rotates in the forward rotation direction and the conical member 32 moves in the direction of an arrow "Not P", the protrusion 331 is disengaged from the parking gear 35.

The parking gear 35 is provided to an axle (not shown) so as to be capable of meshing with the protrusion 331 on the parking lock pawl 33. The parking gear 35 meshing with the protrusion 331 restricts the rotation of the axle. When the shift range is one of the ranges other than P (Not P range), the parking gear 35 is not locked by the parking lock pawl 33, so that the rotation of the axle is not stopped by the parking lock mechanism 30. When the shift range is the P range, the parking gear 35 is locked by the parking lock pawl 33 so that the rotation of the axle is restricted.

As shown in FIGS. 2 and 3, the shift range control apparatus 40 includes motor drivers 41 and 42, an ECU 50, or the like.

The motor driver 41 is a three-phase inverter having bridge-connected switching devices 411 to 416 for selectively applying power to the set of the first windings 11. One end of the U1 coil 111 is connected to a connection point between the pair of U-phase switching devices 411 and 414. One end of the V1 coil 112 is connected to a connection point between the pair of V-phase switching devices 412 and 415. One end of the W1 coil 113 is connected to a connection point between the pair of W-phase switching devices 413 and 416. The other ends of the coils 111 to 113 are connected at a connection 115.

The motor driver 42 is a three-phase inverter having bridge-connected switching devices 421 to 426 for selectively applying power to the set of the second windings 12. One end of the U2 coil 121 is connected to a connection point between the pair of U-phase switching devices 421 and 424. One end of the V2 coil 122 is connected to a connection point between the pair of V-phase switching devices 422 and 425. One end of the W2 coil 123 is connected to a connection point between the pair of W-phase switching devices 423 and 426. The other ends of the coils 121 to 123 are connected at a connection 125.

While the switching devices 411 to 416 and 421 to 426 in the present embodiment are MOSFETs, other devices such as IGBTs may also be used.

A motor relay 46 is provided between the motor driver 41 and the battery 45. A motor relay 47 is provided between the motor driver 42 and the battery 45. The motor relays 46 and 47 are turned on when a starter switch, such as an ignition switch or the like, is turned on, whereby power is supplied to the motor 10. The motor relays 46 and 47 are turned off when the starter switch is turned off, whereby power supply to the motor 10 is shut off.

Figure 4:
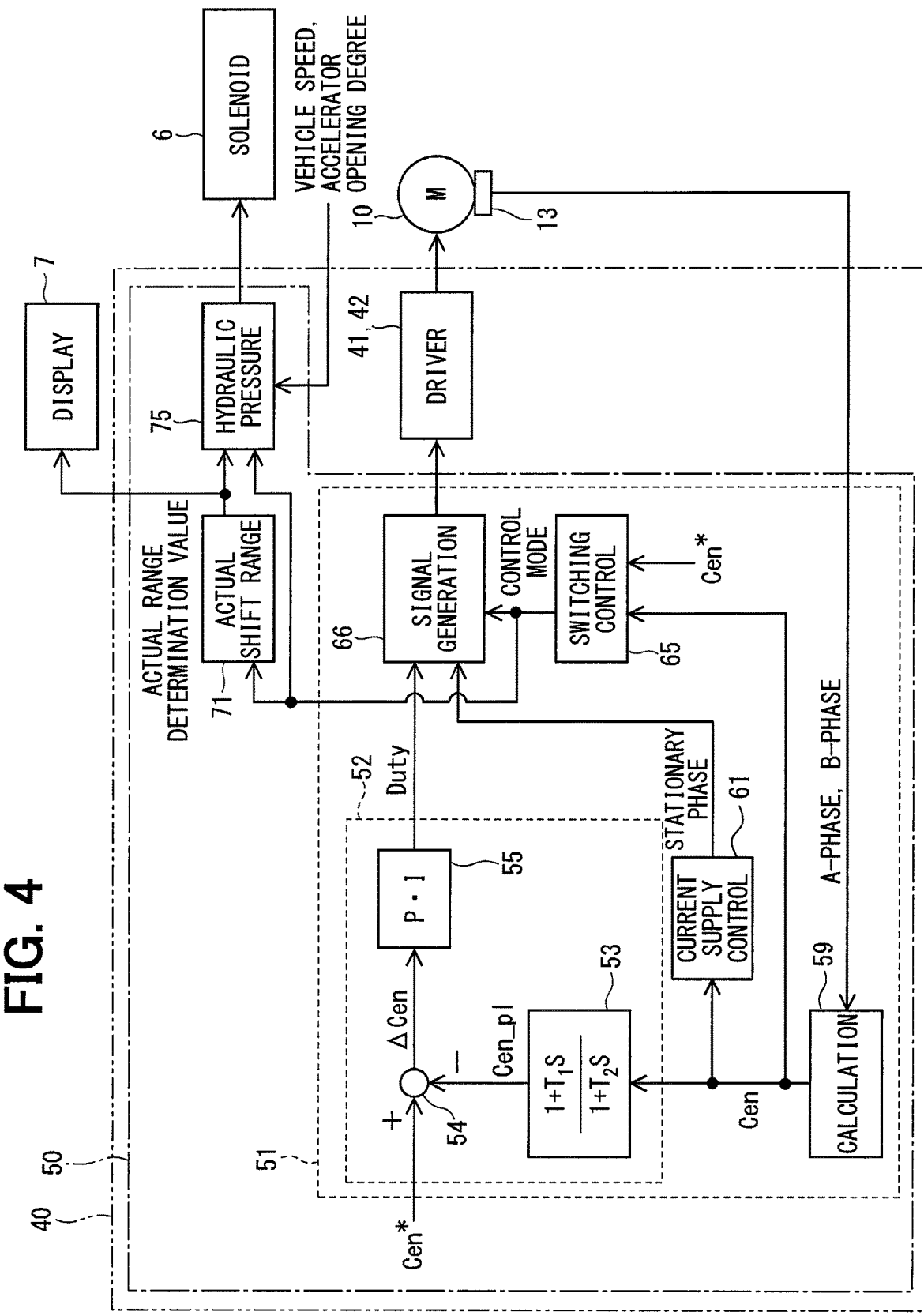
FIG. 4 is a block diagram of a shift range control apparatus according to one embodiment of the present disclosure.

As shown in FIG. 4, the ECU 50 includes a motor drive controller 51 that controls drive of the motor 10, an actual range determination portion 71, and a hydraulic controller 75 that controls hydraulic control solenoid 6 for transmissions provided as hydraulic actuators. Hereinafter, the "hydraulic control solenoid for transmission" is referred to simply as the "solenoid". The ECU 50 is configured with a microcomputer or the like as a main body. Various processes in the ECU 50 may be software processes of a program already stored in a tangible memory device such as a ROM and executed by a CPU, or may be hardware processes performed by special electronic circuits.

While the motor drive controller 51 and the hydraulic controller 75 are provided in one ECU 50 in the present embodiment, they may be provided to separate ECUs, and for example, the motor drive controller 51 may be provided in a motor ECU, and the hydraulic controller 75 may be provided in an AT-ECU.

The motor drive controller 51 includes an angle calculator 59, a feedback controller 52, a stationary phase current supply controller 61, a switching controller 65, a signal generator 66, or the like.

The angle calculator 59 calculates an actual count Cen that is the count value of the encoder 13, based on the A-phase and B-phase pulses output from the encoder 13. The actual count Cen is a value corresponding to the actual mechanical and electrical angles of the motor 10. In the present embodiment, the actual count Cen is referred to as the "actual angle".

As mentioned above, the speed reducer 14 is provided between the motor shaft of the motor 10 and the output shaft 15. When the motor shaft rotates within the range of play in gear teeth of the speed reducer 14 while the starter switch is off, the positions of the motor shaft and the output shaft 15 relative to each other when the starter switch is turned on may not be the same as their positions when the switch has been off. The angle calculator 59 therefore performs initial learning when the starter switch is turned on, in which the motor 10 is rotated in both directions to make the gear teeth meshing with the motor shaft contact with the tooth flanks on both sides so that the count value of the encoder 13 corresponds to the position of the output shaft 15, and calculates a correction value. Hereinafter, the actual count Cen is a value after being corrected with a correction value.

The feedback controller 52 includes a phase advance filter 53, a subtractor 54, and a controller 55, and performs position feedback control.

The phase advance filter 53 performs phase advance compensation for advancing the phase of the actual count Cen and calculates a phase advance value Cen_pl. The phase advance value Cen_pl produced by the phase advance filtering process is also included in the concept of the "actual angle".

The subtractor 54 calculates a deviation ΔCen between a target count Cen* corresponding to a shift range requested by the driver as input by an operation of a shifter or the like (not shown) and the phase advance value Cen_pl.

The controller 55 calculates a duty by PI control or the like to make the deviation ΔCen zero so that the target count Cen* and the phase advance value for the actual count Cen_pl match. In the position feedback control, the amount of current conducting through the coils 111 to 113 and 121 to 123 and the torque can be varied by changing the duty through PWM control and the like.

In the present embodiment, the motor 10 is controlled by a 120° current supply square-wave control scheme. In 120° current supply square-wave control, the high-voltage-side switching devices of the first phase and the low-voltage-side switching devices of the second phase are turned on. The combinations of the first phase and second phase are alternated every 60° electrical angle to switch the current supply phases. This generates rotating magnetic fields in the sets of windings 11 and 12 so that the motor 10 rotates. In the present embodiment, the rotating direction of the motor 10 when the output shaft 15 is rotated in the forward rotation direction is referred to as a forward direction. The possible duty range is from −100 [%] to 100 [%], the duty when the motor 10 outputs a positive torque being positive and the duty when the motor outputs a negative torque being negative. That is, the duty when the motor 10 is rotated in the forward rotation direction is positive, and the duty when the motor is rotated in the reverse rotation direction is negative. When a brake torque (i.e., negative torque) is to be generated to stop the motor 10 rotating in the forward rotation direction, the duty is to be negative even though the motor 10 rotates in the forward rotation direction. Similarly, when a brake torque is to be generated to stop the motor 10 rotating in the reverse rotation direction, the duty is to be positive.

The stationary phase current supply controller 61 performs stationary phase current supply control. The stationary phase current supply control is for stopping the rotation of the motor 10, in which a stationary phase corresponding to an electrical angle is selected, and the switching devices 411 to 416 and 421 to 426 are controlled such that current flows in a predetermined direction of the selected stationary phase. This fixes an excitation phase. When the excitation phase is fixed, the motor 10 stops at a predetermined electrical angle corresponding to the excitation phase. The stationary phase current supply controller 61 selects a stationary phase and current supply direction, based on the actual count Cen to stop the motor 10 at an electrical angle closest to the current rotor position.

The stationary phase current supply control is carried out when the difference between the actual count Cen and the target count Cen* becomes an angle determination threshold ENth or lower. Therefore, when stationary phase current supply control is being performed, it can be regarded that the actual count Cen is substantially equal to the target count Cen*. This means that stopping the motor 10 at a nearest possible electrical angle from the current rotor position allows the motor to stop at the location substantially corresponding to the target count Cen*. Strictly speaking, there is a difference, the maximum of which is determined by the motor resolution, between the electrical angle corresponding to the target count Cen* and the electrical angle at which the motor 10 is stopped by the stationary phase current supply control. When the reduction ratio of the speed reducer 14 is large, the difference in the stopping position of the output shaft 15 is negligible.

The switching controller 65 switches the control modes of the motor 10. The control mode selected by the switching controller 65 is output to the signal generator 66, actual range determination portion 71, and hydraulic controller 75. In the present embodiment, the switching controller 65 switches between position feedback control and stationary phase current supply control, based on the target count Cen* and actual count Cen.

The switching controller 65 selects the position feedback control as the control mode of the motor 10 when there is a change in the shift range requested by the driver. The switching controller 65 switches the control mode to stationary phase current supply control when the absolute value of the difference between the target count Cen* and the actual count Cen becomes an angle determination threshold ENth or lower. The switching controller 65 maintains the stationary phase current supply control until a continuous current supply time Ta passes from the switching to the stationary phase current supply control. After the continuous current supply time Ta has passed, power-off control is carried out. In this power-off control, all the switching devices 411 to 416 and 421 to 426 are turned off. In the present embodiment, the absolute value of the difference between the target count Cen* and the actual count Cen is equivalent to the "difference value between a target angle and an actual angle".

The signal generator 66 generates a drive signal to turn on or off the switching devices 411 to 416 and 421 to 426 in accordance with the control mode selected by the switching controller 65, and outputs the signal to the motor drivers 41 and 42. The drive of the motor 10 is thus controlled.

The actual range determination portion 71 determines actual shift range, based on the shift range requested by the driver and the control mode of the motor 10. The actual range determination value is output to the hydraulic controller 75 and a display device 7. The display device 7 is provided for example in an instrument panel or the like, and displays the actual shift range determined by the actual range determination portion 71.

The hydraulic controller 75 controls and drives the solenoid 6, based on the vehicle speed, an accelerator opening degree, and an actual range determination value. The number of solenoids 6 corresponds to the number of transmission gears and the like. Controlling the solenoid 6 allows for controlling the hydraulic pressure to be applied to the hydraulic clutch so that the transmission gears are switchable. In the present embodiment, control by which the solenoid 6 are brought to a neutral state in which no hydraulic pressure is applied to the hydraulic pressure supply paths is referred to as the neutral control. Hereinafter, where applicable, the neutral control of solenoid 6 is referred to as the "N control".

Figure 5:
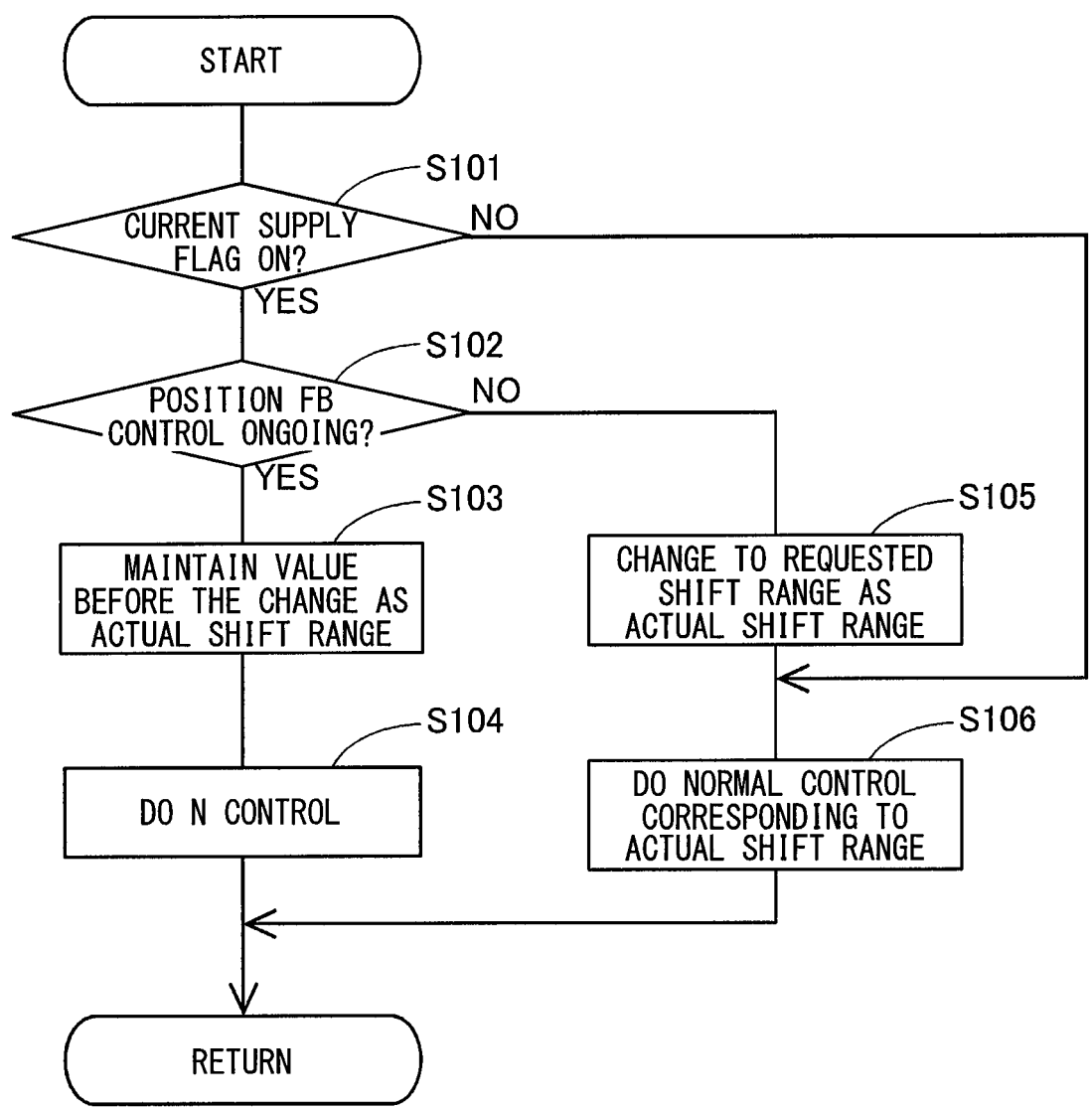
FIG. 5 is a flowchart explaining the process of determining an actual shift range according to one embodiment of the present disclosure.

The actual shift range determination process will be described with reference to the flowchart of FIG. 5. This process is carried out on predetermined cycles by the ECU 50 during a period in which the starter switch is on.

In the first S101, the ECU 50 determines whether a current supply flag has been turned on. The current supply flag is turned on when there is a change in the shift range requested by the driver, and turned off when the stationary phase current supply control is ended. When it is determined that the current supply flag is off (S101: NO), the process goes to S106. When it is determined that the current supply flag is on (S101: YES), the process goes to S102.

At S102, the actual range determination portion 71 determines whether the control mode of the motor 10 is the position feedback control. When it is determined that the control mode of the motor 10 is not the position feedback control (S102: NO), the process goes to S105. When it is determined that the control mode of the motor 10 is the position feedback control (S102: YES), the process goes to S103.

At S103, the actual range determination portion 71 does not change the actual range determination value, and maintains the value obtained before the change in the shift range requested by the driver.

At S104, the hydraulic controller 75 performs N control as the control mode of the solenoid 6. When the N control is already being carried out on the solenoid 6, the N control is continued.

When the current supply flag is on (S101: YES), as well as the control mode of the motor 10 is not the position feedback control (S102: NO), that is, is in the stationary phase current supply control, at S105, the actual range determination portion 71 changes the actual range determination value so that the shift range requested by the driver matches the actual shift range. When the shift range requested by the driver already corresponds to the actual shift range, the controller keeps the actual range determination value.

At S106, the hydraulic controller 75 performs normal control on the solenoid 6 in accordance with the actual range determination value. When the control mode already corresponds to the actual range determination value, the controller keeps the control mode. For example, when the shift range requested by the driver is P range or N range, the hydraulic controller 75 continues the N control.

Figure 6:
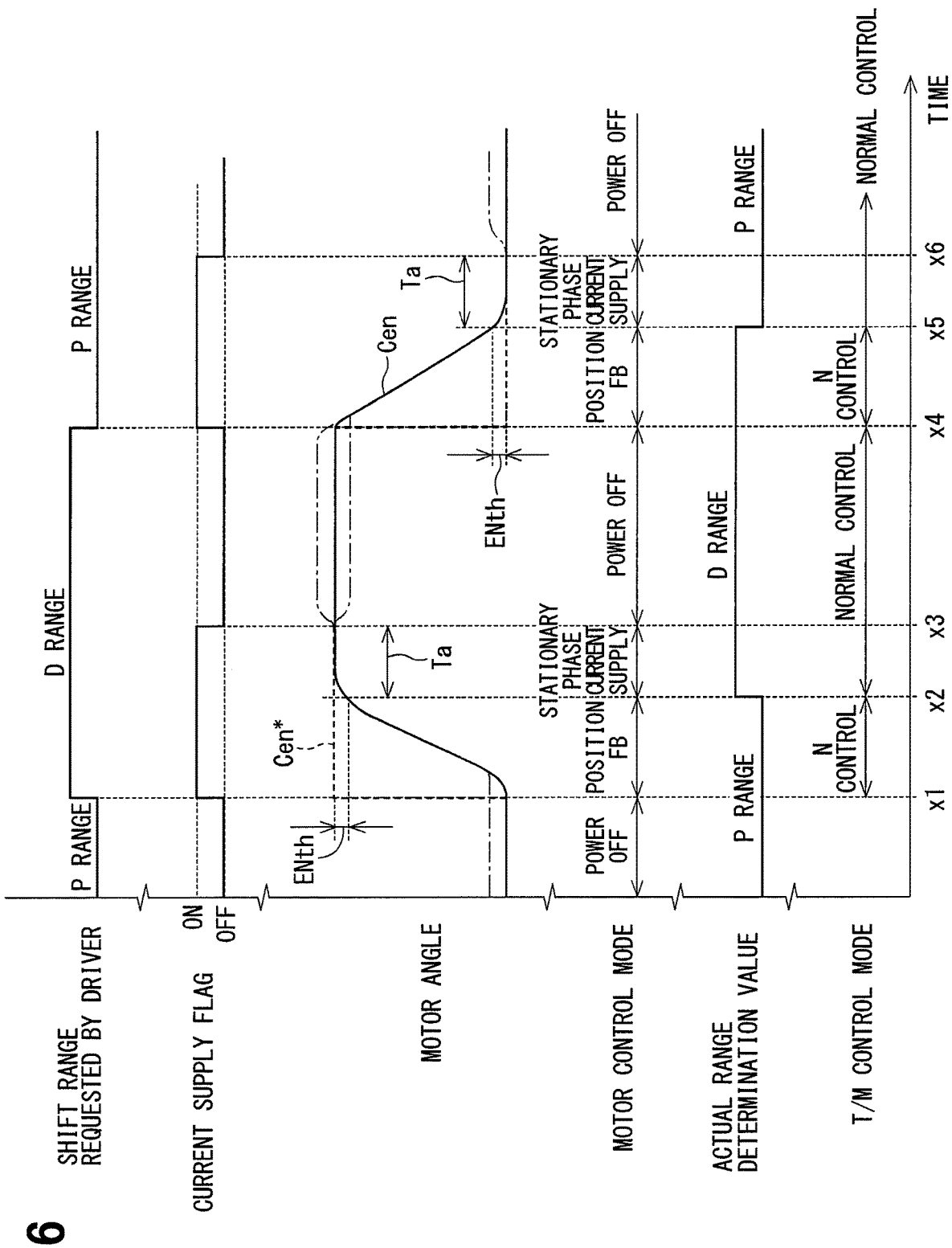
FIG. 6 is a time chart explaining the process of determining an actual shift range according to one embodiment of the present disclosure.

The actual shift range determination process will be described with reference to the time chart of FIG. 6. FIG. 6 shows the shift range requested by the driver, current supply flag, angle of the motor 10 (referred to as the "motor angle" in FIG. 6), control mode of the motor 10 (referred to as the "motor control mode" in FIG. 6), actual range determination value, and control mode of the solenoid 6 (referred to as the "T/M control mode" in FIG. 6), with the horizontal axis representing the common time axis. The motor angle in FIG. 6 indicates the angle of the motor 10 with count values of the encoder 13. The one-dot chain lines of the motor angle in FIG. 6 indicate the range of play in gear teeth of the speed reducer 14. During the power-off control, the motor 10 can rotate within this range. The indication of the range of play in the reverse rotation direction is omitted before time x1 and after time x6. It is assumed in the description below that the motor 10 does not rotate during the power-off control, as indicated by the solid line.

As shown in FIG. 6, before the time x1, when the shift range requested by the driver is P range, the motor 10 is subjected to power-off control. During the power-off control, all the switching devices 411 to 416 and 421 to 426 are turned off, so that no power is supplied to the motor 10. The motor relays 46 and 47 are kept turned on when the starter switch is on, so that the motor relays 46 and 47 are on even during the power-off control.

At time x1, when the shift range requested by the driver is changed from P range to D range, the current supply flag that has been off is switched on.

As indicated by broken lines of the motor angle in FIG. 6, when the shift range requested by the driver is changed, a target count Cen* is set corresponding to the shift range requested by the driver. Immediately after time x1 when the shift range requested by the driver is changed, the difference between the target count Cen* and the actual count Cen is larger than the angle determination threshold ENth, so that the motor 10 is subjected to position feedback control. Thus, the actual count Cen is made closer to the target count Cen*. A phase advance value Cen_pl obtained by phase advance filtering can be fed back to improve the responsiveness.

At time x2, when the difference between the target count Cen* and the actual count Cen becomes the angle determination threshold ENth or lower, the control mode of the motor 10 is switched from the position feedback control to the stationary phase current supply control. The stationary phase current supply enables the motor 10 to stop quickly.

During the period from time x2 to time x3 when the continuous current supply time Ta has passed, the stationary phase current supply control is continued. This prevents hunting and the like and enables the motor 10 to stop reliably, so that the detent roller 26 can be fitted to a desired recess reliably.

At time x3 when the continuous current supply time Ta has passed from the start of the stationary phase current supply control, the switching controller 65 changes the control mode to power-off control. The controller also turns off the current supply flag. The off-state of the current supply flag is kept until the shift range requested by the driver is changed again, so that the power-off control of the motor 10 is kept as its control mode. In this way, no power is applied to the motor 10 except when the shift ranges are switched, so that power consumption can be reduced as compared to when power application is continued.

In the present embodiment, as indicated by the actual range determination value in FIG. 6, the actual range determination portion 71 keeps the P range, which is the range before the change in the shift range requested by the driver, as the actual range determination value, during the period from time x1 to time x2 in which the control mode of the motor 10 is the position feedback control. As indicated by the T/M control mode in FIG. 6, the hydraulic controller 75 maintains the N control of the solenoid 6 as their control mode during the period from time x1 to time x2. When the control mode of the solenoid 6 before the change in the shift range requested by the driver is the N control, the N control is maintained.

At time x2 when the control mode of the motor 10 is switched from the position feedback control to the stationary phase current supply control, the actual range determination portion 71 changes the actual range determination value to a value that corresponds to the shift range requested by the driver. More specifically, the actual range determination portion 71 changes the actual shift range from P range to D range.

At time x2, the hydraulic controller 75 switches the control mode of the solenoid 6 to normal control corresponding to the actual range determination value.

In other words, the hydraulic controller 75 in the present embodiment selects the N control as the control mode of the solenoid 6 when the shift range requested by the driver does not match the actual shift range, and selects the normal control corresponding to the actual shift range as the control mode of the solenoid 6 when the shift range requested by the driver corresponds to the actual shift range.

During the period from time x3 to time x4 when the shift range requested by the driver is changed next time, the power-off control of the motor 10 is maintained as its control mode, and the normal control of the solenoid 6 corresponding to the actual shift range is maintained as their control mode.

The process from time x4 to time x6 is substantially the same as the process from time x1 to time x3 except that the rotation direction of the motor 10 is changed.

That is, when the shift range requested by the driver is changed at time x4, the current supply flag is turned on, and a target count Cen* is set corresponding to the shift range requested by the driver. During the period from time x4 to time x5, the difference between the target count Cen* and the actual count Cen is larger than the angle determination threshold ENth, so that the switching controller 65 selects the position feedback control as the control mode of the motor 10. The actual range determination portion 71 maintains D range that has been determined before the change in the shift range requested by the driver as the actual range determination value, and the hydraulic controller 75 selects the N control as the control mode of the solenoid 6.

At time x5, when the difference between the target count Cen* and the actual count Cen becomes the angle determination threshold ENth or lower, the switching controller 65 switches the control mode of the motor 10 from the position feedback control to the stationary phase current supply control, and maintains the stationary phase current supply control throughout the continuous current supply time Ta. When the control mode of the motor 10 is switched to the stationary phase current supply control, the actual range determination portion 71 changes the actual range determination value from D range to P range to match the shift range requested by the driver. The hydraulic controller 75 switches the control mode of the solenoid 6 from the N control to normal control corresponding to the actual shift range.

At time x6 when the continuous current supply time Ta has passed after the control mode of the motor 10 has been switched to the stationary phase current supply control, the switching controller 65 switches the control mode of the motor 10 to the power-off control, and turns off the current supply flag.

In the present embodiment, the actual range determination portion 71 determines an actual shift range in accordance with the control mode of the motor 10, so that it can determine the actual shift range correctly without using detection values or the like of, for example, the output shaft sensor 16. The accuracy requirements for the output shaft sensor 16 can therefore be reduced as compared to when the actual shift range is determined based on the output values of the output shaft sensor 16.

In controlling the solenoid 6, the control mode before switching to normal control corresponding to the actual shift range is set to N control, so that the hydraulic pressure can be switched smoothly during the normal control.

Additionally, the control mode of the solenoid 6 during the position feedback control is set to N control, so that, even in the event of a failure in the motor 10 during the position feedback control, reverse running or the like can be prevented without providing additional fail-safe measures, and thus safety features are improved.

As described above, the shift range control apparatus 40 of the present embodiment switches the shift range by controlling the motor 10 and includes a motor drive controller 51 and an actual range determination portion 71.

The motor drive controller 51 is capable of switching between at least two control modes as motor control modes that are modes in which the motor 10 is controlled. Motor control modes herein may also be interpreted as motor control schemes.

The actual range determination portion 71 determines an actual shift range, based on the requested shift range and the motor control mode.

In this way, the actual shift range can be determined correctly based on the motor control mode.

The motor drive controller 51 includes a feedback controller 52, a stationary phase current supply controller 61, and a switching controller 65.

The feedback controller 52 performs position feedback control, based on an actual angle of the motor 10 (the actual count Cen in the present embodiment) and a target angle corresponding to the requested shift range (the target count Cen* in the present embodiment).

The stationary phase current supply controller 61 performs stationary phase current supply control in which power is applied to a stationary phase selected in accordance with an actual angle.

The switching controller 65 selects the position feedback control as the motor control mode when the requested shift range is changed. The switching controller 65 switches the motor control mode from the position feedback control to the stationary phase current supply control when the difference value between the target angle and the actual angle becomes an angle determination threshold ENth or lower.

The actual range determination portion 71 maintains the shift range before the requested shift range has been changed as the actual shift range when the position feedback control is being carried out. When the motor control mode is switched from the position feedback control to the stationary phase current supply control, the actual range determination portion 71 changes the actual shift range to match the requested shift range.

According to the present embodiment, the position feedback control is carried out when the requested shift range is changed so that the responsiveness can be enhanced. When the actual angle becomes close to the target angle, the position feedback control is switched to the stationary phase current supply control so that the motor 10 can be stopped correctly. In this way, correct control of the motor 10 associated with the switching of shift ranges can be achieved.

Since the stationary phase current supply control is a control scheme for stopping the motor 10, it can be regarded as an indication, or a guarantee, of completion of a change in the shift range by the shift-by-wire system 1. Thus, the actual shift range can be changed correctly in accordance with the motor control mode, based on the fact that the position feedback control has switched to the stationary phase current supply control as a trigger.

The shift range control apparatus 40 further includes a hydraulic controller 75 that controls the solenoid 6 that control hydraulic pressure for the switching of transmission gears in accordance with the motor control mode.

The hydraulic controller 75 performs neutral control on the solenoid 6 when the motor control mode is the position feedback control. When the motor control mode is switched from the position feedback control to the stationary phase current supply control, the hydraulic controller 75 starts controlling the solenoid 6 to achieve hydraulic pressure corresponding to the actual shift range.

In this way, the solenoid 6 can be controlled correctly based on the motor control mode. By performing N control during the position feedback control, hydraulic pressure levels can be changed smoothly. Even when there is a failure in the motor 10 during the position feedback control, safety can be secured.

Other Embodiments

In the embodiment described above, the motor is a permanent magnet three-phase brushless motor. In other embodiments, any other motors can be used as long as it is capable of switching between position feedback control and stationary phase current supply control. In the embodiment described above, two sets of windings are provided in the motor. In other embodiments, the number of sets of windings in the motor may be one, or three or more.

In the embodiment described above, the position feedback control adopts a 120° current supply square-wave control scheme. In other embodiments, the position feedback control may adopt a 180° current supply square-wave control scheme. The control scheme is not limited to square-wave control. PWM control with triangle wave comparison or instantaneous vector selection is also possible.

In the embodiment described above, the motor control mode is switched between the position feedback control and the stationary phase current supply control. In other embodiments, the motor drive controller may realize a different control mode instead of at least one of the position feedback control and the stationary phase current supply control.

In the embodiment described above, an encoder is used as the rotation angle sensor for detecting the rotation angle of the motor. In other embodiments, the rotation angle sensor need not necessarily be an encoder and any other devices may be used, such as a resolver or the like. In the embodiment described above, the count value of the encoder is subjected to phase advance filtering and used for the position feedback control. In other embodiments, the position feedback control may be performed using the rotation angle itself of the motor, or other values convertible to the motor rotation angle, other than the encoder count. The same applies to selection of a stationary phase in the stationary phase current supply control. In other embodiments, the phase advance filtering process may be omitted.

In the embodiment described above, the detent plate has four recesses. In other embodiments, the number of recesses is not limited to four, and can be any number. For example, the detent plate may have two recesses for switching between P range and "Not P" range. The shift range switching mechanism, parking lock mechanism, and others may be different from those described in the embodiment above.

In the embodiment described above, the hydraulic actuators are hydraulic control solenoid for transmissions. In other embodiments, hydraulic actuators other than solenoid may be used.

In the embodiment described above, the actual range determination portion determines actual shift range, based on the requested shift range and the motor control mode. In other embodiments, the actual range determination portion may determine actual shift range based also on other parameters such as the detection value or the like of the output shaft sensor, in addition to the requested shift range and the motor control mode.

The present disclosure is not limited to the above embodiments. The present disclosure can be embodied in various modes without departure of the scope of disclosure.

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of a shift range control apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A shift range control apparatus that switches shift ranges by controlling a drive of a motor, the shift range control apparatus comprising:
   a motor drive controller that is capable of switching a motor control mode, the motor control mode being a mode in which the motor is controlled; and
   a range determination portion that determines a shift range based on a requested shift range and the motor control mode, wherein:
   the motor drive controller includes
      a feedback controller that performs position feedback control based on an angle of the motor and on a target angle determined by the requested shift range,
      a stationary phase current supply controller that performs stationary phase current supply control in which power is supplied to a stationary phase selected in accordance with a current angle of the motor to stop the motor at an angle closest to a current rotor position, and
      a switching controller that selects the position feedback control as the motor control mode when the requested shift range is changed, and switches the motor control mode from the position feedback control to the stationary phase current supply control when a difference value between the target angle and the angle becomes an angle determination threshold or lower; and
   the range determination portion
      keeps a shift range before a change in the requested shift range as the shift range when the motor control mode is the position feedback control; and
      determines the shift range as the requested shift range when the motor control mode is switched from the position feedback control to the stationary phase current supply control.

2. The shift range control apparatus according to claim 1, further comprising
  a hydraulic controller that controls a hydraulic actuator that controls hydraulic pressure for switching of transmission gears in accordance with the motor control mode.

3. The shift range control apparatus according to claim 1, further comprising
  a hydraulic controller that controls a hydraulic actuator that controls hydraulic pressure for switching of transmission gears in accordance with the motor control mode,
  wherein:
  the hydraulic controller
    performs neutral control on the hydraulic actuator when the motor control mode is the position feedback control; and
    starts control of the hydraulic actuator to achieve a hydraulic pressure in accordance with the shift range when the motor control mode is switched from the position feedback control to the stationary phase current supply control.

4. The shift range control apparatus according to claim 1, wherein the range determination portion outputs a range determination value corresponding to the determined shift range to a hydraulic controller.

* * * * *